(12) United States Patent
Daily et al.

(10) Patent No.: US 12,405,360 B1
(45) Date of Patent: Sep. 2, 2025

(54) ROLLABLE, LARGE VERTICAL APERTURE, ACOUSTIC PLANAR TOWED ARRAY

(71) Applicant: The United States of America as represented by the Secretary of the Navy, Newport, RI (US)

(72) Inventors: David J Daily, Middletown, RI (US); Simon E Freeman, Portsmouth, RI (US); Lauren A Freeman, Portsmouth, RI (US); William A Visser, West Warwick, RI (US); Jason R Morin, Silver Spring, MD (US)

(73) Assignee: The United States of America as represented by the Secretary of the Navy

( * ) Notice: Subject to any disclaimer, the term of this patent is extended or adjusted under 35 U.S.C. 154(b) by 326 days.

(21) Appl. No.: 18/202,339

(22) Filed: May 26, 2023

(51) Int. Cl.
    *G01S 7/54* (2006.01)
    *G01H 3/00* (2006.01)
    *G01S 7/521* (2006.01)
    *G01S 11/14* (2006.01)
    *H04R 1/44* (2006.01)

(52) U.S. Cl.
    CPC ............... *G01S 7/54* (2013.01); *G01S 7/521* (2013.01); *G01S 11/14* (2013.01); *H04R 1/44* (2013.01); *G01H 3/00* (2013.01)

(58) Field of Classification Search
    CPC ........... G01S 7/521; G01S 11/14; H04R 1/44; G01H 3/00
    See application file for complete search history.

(56) References Cited

U.S. PATENT DOCUMENTS

| 9,293,238 B1* | 3/2016 | Stottlemyer | G01V 1/201 |
| 2017/0018853 A1* | 1/2017 | Stocke, Jr. | H01Q 17/00 |

\* cited by examiner

*Primary Examiner* — Daniel L Murphy
*Assistant Examiner* — Amie M Ndure
(74) *Attorney, Agent, or Firm* — James M. Kasischke; Jeffry C. Severson

(57) ABSTRACT

A planar sensor array includes a center tube, a first group of tubes, and a second group of tubes. One or more of the first group of tubes is positively buoyant, and at least one of the second group of tubes is negatively buoyant. Adjacent tubes are joined together by hinges. Acoustic sensors are positioned within the tubes. First and second half-shells are connected to the most distal tube of each group. The first half-shell is positively buoyant, and the second half-shell is negatively buoyant. An actuator attached to said center tube, and fins are attached to the actuator. The actuator is adjustable to change the fins angle of attack. Environmental fluid flow over the fins induces a torque on the actuator and center tube and causes these components to rotate. Rotation of the center tube causes the first and second groups of tubes to wrap around the center tube.

18 Claims, 12 Drawing Sheets

ROLLABLE, LARGE VERTICAL APERTURE, ACOUSTIC PLANAR TOWED ARRAY

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

BACKGROUND OF THE INVENTION

1) Field of the Invention

The present invention is directed to towed acoustic arrays and more particularly to a rollable, vertical aperture, acoustic planar towed array that provides large vertical aperture sonar capability.

2) Description of the Prior Art

Arrays of sensors are towed for sensing sound below the surface of the ocean. Typically, such arrays are linear assemblies of modules. Hydrophones or other sensors are mounted in the module sections. Sound pressure waves in the ocean pass through the wall of various sections where the hydrophones sense the pressure fluctuations and transform the sensed pressures into electrical signals, which are transmitted back to a support vessel.

Other arrays, called large aperture arrays, are also used for sensing in the ocean. Such large aperture arrays can be planar or volumetric, having width, depth, and length dimensions. Large aperture sensor arrays are difficult to deploy and control in open ocean due to their size and shape. These problems are further exacerbated by sea-state motion, wave slap, and wind.

There remains a need for a large aperture sensor array that is stable when towed and deployed, and is then collapsible so that it can be easily brought on board a ship and stored.

SUMMARY OF THE INVENTION

The present invention discloses an array that can be deployed to obtain acoustic data and can then be retrieved. The array collapses to a small profile and can expand to its full size. A vertically stacked array of hydrophone tubes is used such that the tubes are connected together to form a single planar array.

The array of the present invention includes three sections, a neutrally buoyant center tube, which forms the main tow body of the array and has acoustic sensors along its length with radial ducted fins on the aft of the center tube. Above the center tube is a plurality of positively buoyant tubes that are connected together at the fore and aft by hinges. This allows the tubes to roll up around the center tube. Below the center tube is an array of negatively buoyant tubes, which are also connected together with hinges. Like the positively buoyant tubes, this allows the tubes to roll around the center tube.

According to an embodiment, a sensor array includes a center tube, a first plurality of tubes connected to a first side of the center tube, and a second plurality of tubes connected to a second side of the center tube. The center tube is neutrally buoyant while the first plurality of tubes is positively buoyant and the second plurality of tubes is negatively buoyant. The first plurality of positively buoyant tubes includes intermediate tubes and a first end tube. Intermediate tubes and the first end tube are connected at each end to an adjacent tube by a hinge. The first end tube is the most distal tube from the center tube. The second plurality of negatively buoyant tubes and a most distal, second end tube. These tubes are connected at each end to an adjacent tube by a hinge at its fore and aft end. Each of the center tube, the first plurality of positively buoyant tubes, and the second plurality of negatively buoyant tubes includes acoustic sensors along its length. A first half-shell, which is positively buoyant, is connected to the first end tube. A second half-shell, which is negatively buoyant, is connected to the second end tube. An actuator assembly is attached to the aft end of the center tube. The actuator assembly includes a plurality of adjustable fins. The fins are connected to an actuator that can change the angle of attack of the fins and, when subjected to environmental fluid flow, induce a torque on the center tube. This torque causes rotation of the center tube and causes a force on the hinges on the first plurality of positively buoyant tubes and the second plurality of negatively buoyant tubes. This force acts to fold the hinges while wrapping the tubes around the center tube.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
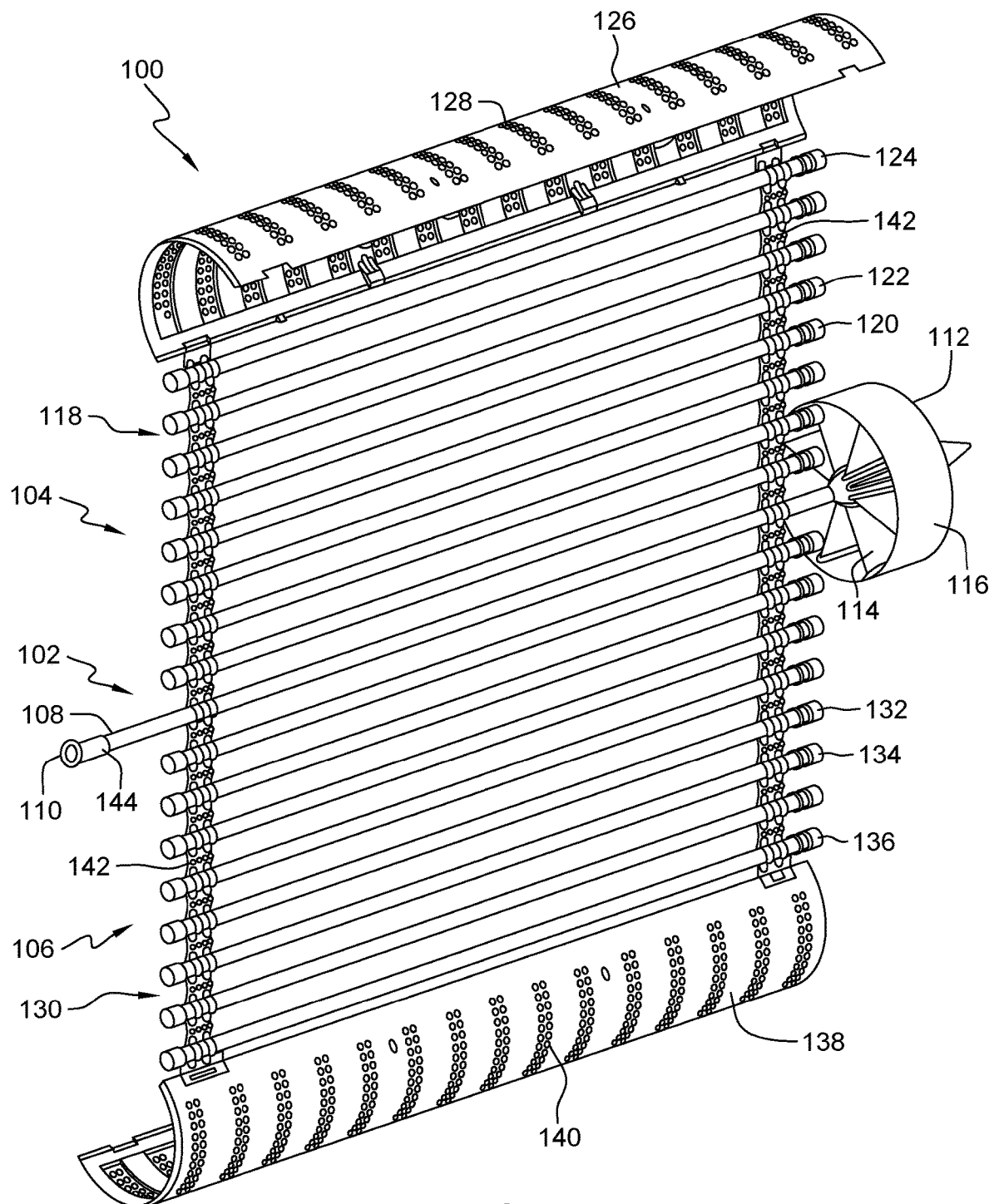
FIG. 1 shows an array according to an embodiment in a deployed configuration.

Referring to the drawings, FIG. 1 depicts an array, indicated generally as 100, having three sections: a middle section 102, a top section 104, and a bottom section 106. The middle section 102 includes a center tube 108, which forms the main tow body of the array 100. The center tube 108 can be neutrally buoyant and have acoustic sensors positioned inside and along its length. A tow point 110 is provided on the forward end of the center tube 108 and an actuator assembly 112 is attached on the aft end. The actuator assembly 112 includes a plurality of fins 114. In some embodiments, the fins 114 may be located in a radial duct 116. The actuator assembly 112 can be adjusted to change the angle of attack of the fins 114 and apply a torque to the center tube 108, as described below. The top section 104 is above the center tube 108 and includes a first plurality of tubes 118 having intermediate tubes 120 connected to adjacent tubes 122. A first end tube 124 is most distal above the center tube 108. The tubes 120, 122, 124 in the first plurality of tubes 118 are positively buoyant and have acoustic sensors positioned inside and along their length. Attached to the top section 104 of the array 100 is a first half-shell 126. The first half-shell 126 is positively buoyant and includes a first plurality of holes 128 therein for water to pass therethrough. The bottom section 106 is below the center tube 108 and includes a second plurality of tubes 130 having intermediate tubes 132 connected to adjacent tubes 134. A second end tube 136 is most distal below the center tube 108. The tubes 132, 134, 136 in the second plurality of tubes 130 are negatively buoyant and have acoustic sensors positioned inside and along their length. Attached to the bottom section 106 of the array 100 is a second half-shell 138. The second half-shell 138 is negatively buoyant and includes a second plurality of holes 140 therein for water to pass therethrough. The center tube 108 and the intermediate tubes 120 in the first plurality of tubes 118 and the intermediate tubes 132 in the second plurality of tubes 130 are connected fore and aft to the adjacent tubes 122, 134, respectively, and to the first end tube 124 and second end tube 136 by hinges 142. The hinges 142 fold allowing the tubes to position against each other. This allows the first plurality of tubes 118 and the second plurality of tubes 130 to roll up around the center tube 108.

The hinges 142 support the weight of the tubes 120, 122, 124 in the first plurality of tubes 118 and the tubes 132, 134, 136 in the second plurality of tubes 130 and allow wires to pass from one tube to the next to allow power and telemetry cables to pass through the hinges 142. The hinges 142 are hydrodynamic to reduce drag and flow noise in the array 100 and can have a rake angle to shed lines or seaweed that may catch on the array 100. The hinges 142 permit the array 100 to be towed stably while expanded and facilitate the collapsing and expanding of the array.

In some embodiments, the hinges 142 can be equipped with sensors to measure the position of the array 100 to determine if it is open or closed. For this purpose, each tube in the first plurality of tubes 118 and the second plurality of tubes 130 can include a tilt sensor that measures the direction of gravity with respect to a datum. When gravity and the datum are aligned, the operator would know the array 100 is vertical. When gravity and the datum are not aligned, the array 100 is not vertical, or the array 100 is wrapped up. These measurements can be transmitted live to the operators allowing determination of the current positioning of the array 100. When collapsed, the tilt sensors will show that the array 100 is wrapped up. If the measurements are static, the operator will know that the array 100 has successfully closed and is not trying to reopen.

The tow point 110 includes an Electro-Optical (E/O) coupler 144, or other appropriate device, to allow the array 100 to rotate freely while wrapping up. The E/O coupler 144 can be an E/O slip ring or other similar device, as would be known to one of ordinary skill in the art.

Figure 2:
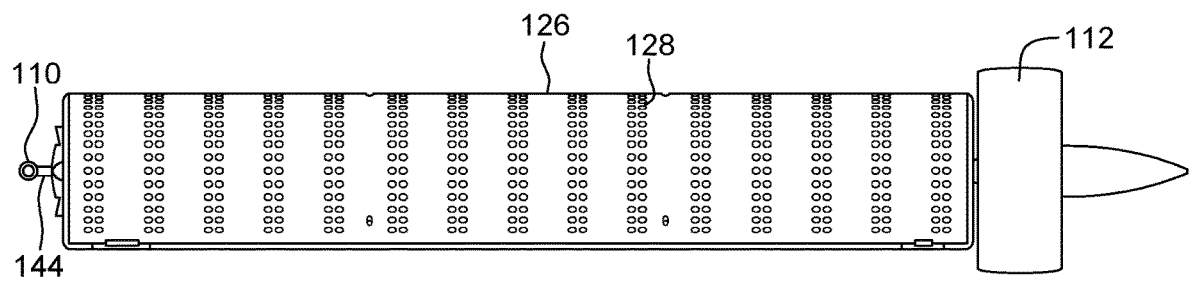
FIG. 2 shows the array of FIG. 1 in a stowed configuration.
Figure 3A:
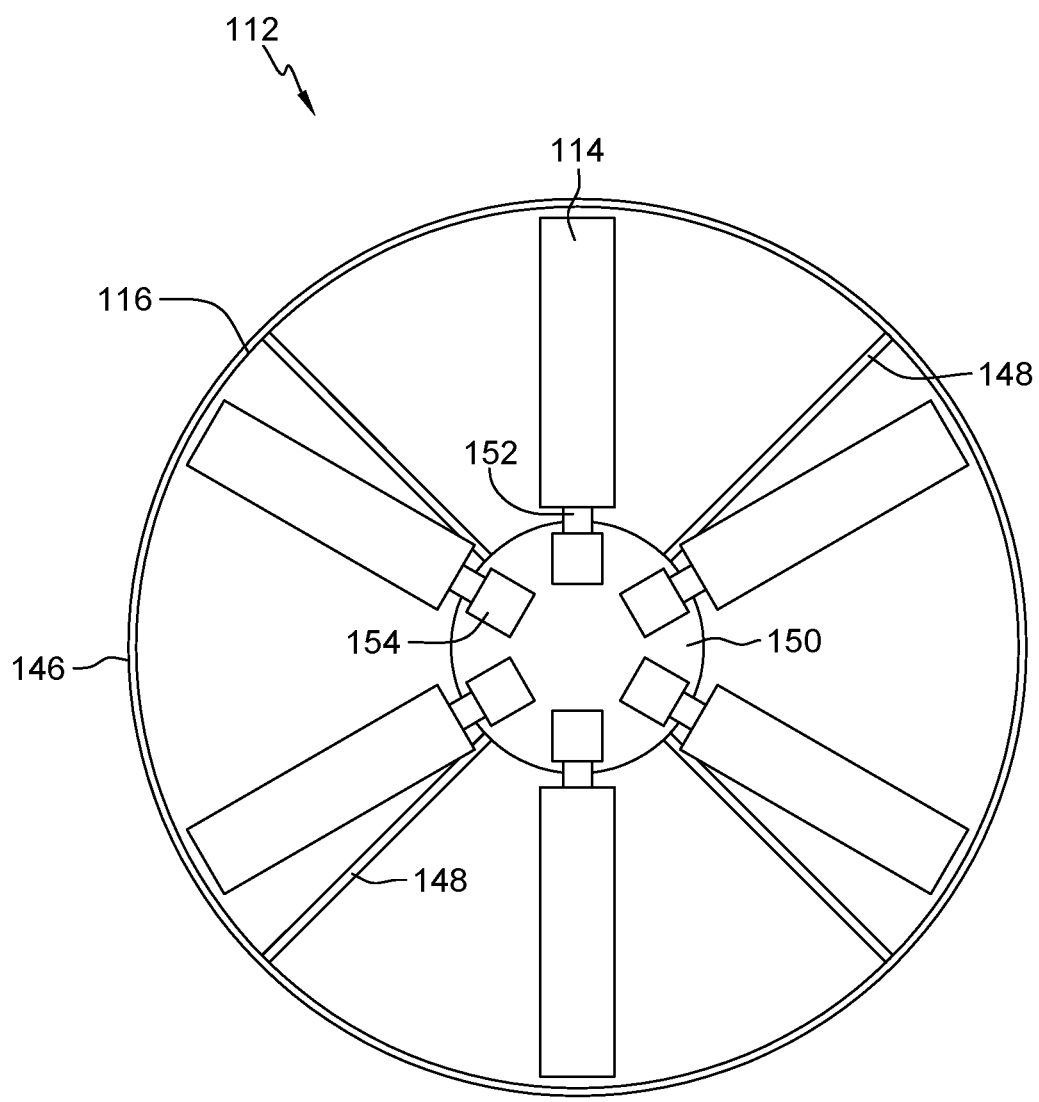
FIG. 3A shows an embodiment of an actuator assembly.

As shown in FIG. 2, each of the first half-shell 126 and second half-shell 138 (not shown) can be formed as a cylinder that is split longitudinally down the middle. Together, the first half-shell 126 and second half-shell 138 form a cylinder that encloses the array 100 in a stowed position. FIG. 3A is an end view of an actuator assembly 112, according to an embodiment. The actuator assembly 112 includes a plurality of fins 114 having a band 146 surrounding the fins 114. A plurality of supports 148 connects the band 146 to a central housing 150. The supports 148 prevent the band 146 from interfering with operation of the fins 114. On the proximal end of each of the fins 114 is a shaft 152 connected to an actuator 154 in the central housing 150. For example, in one embodiment, the actuators 154 can be motors, such as a stepper motor, to control each fin 114 independently.

Figure 3B:
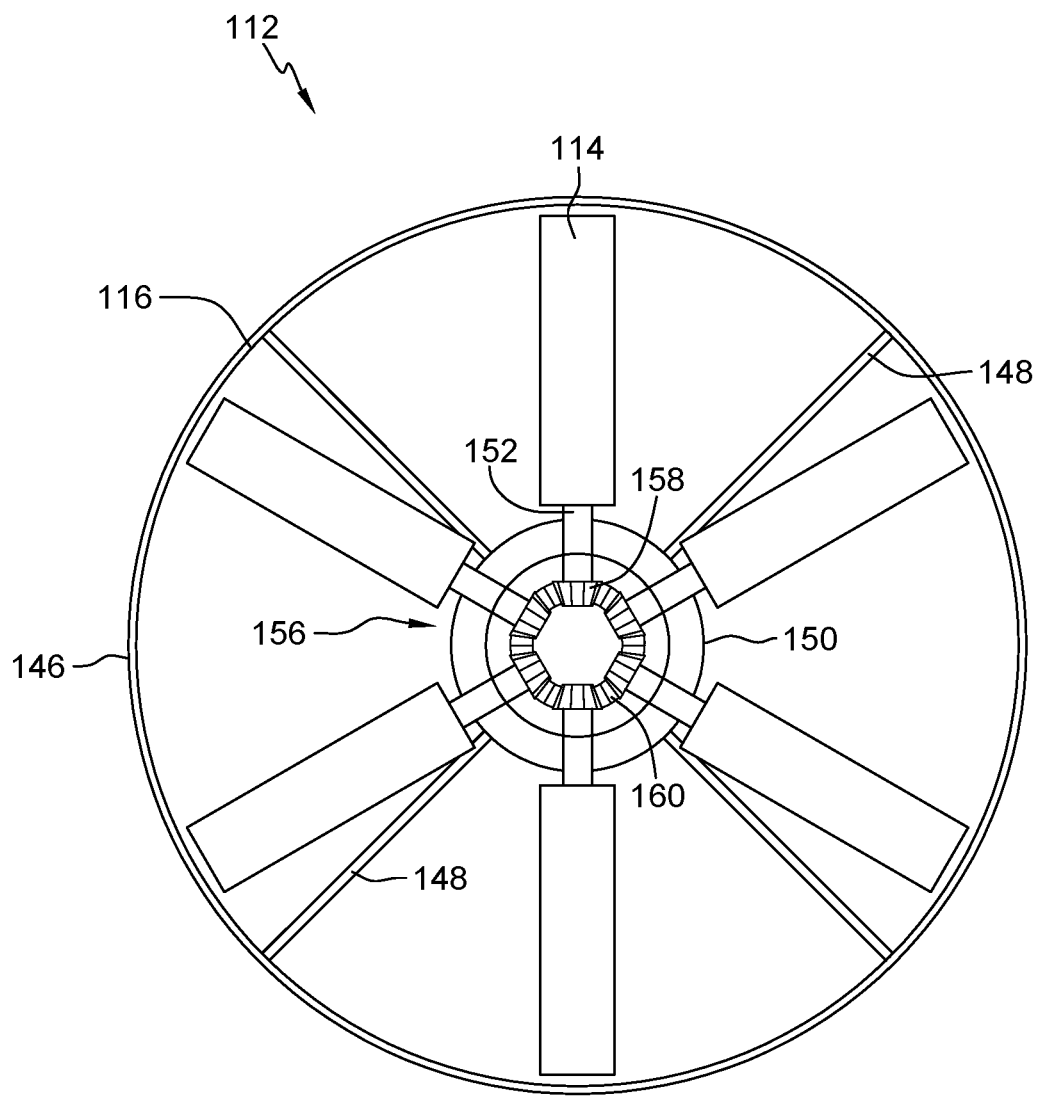
FIG. 3B shows another embodiment of an actuator assembly.

As shown in FIG. 3B, the actuator assembly 112 may include a mechanical actuator 156 that has bevel gears 158, such as orthogonal circumferential bevel gears, attached to the proximal end of the shaft 152 for each of the fins 114. The bevel gears 158 are engaged with a central gear 160 that, when turned, actuates all the fins 114 identically. In either case, the center tube 108 is connected to the central housing 150. In this way, the fins 114 can be adjusted to apply a torque to the central housing 150 in order to rotate the center tube 108.

Figure 4:
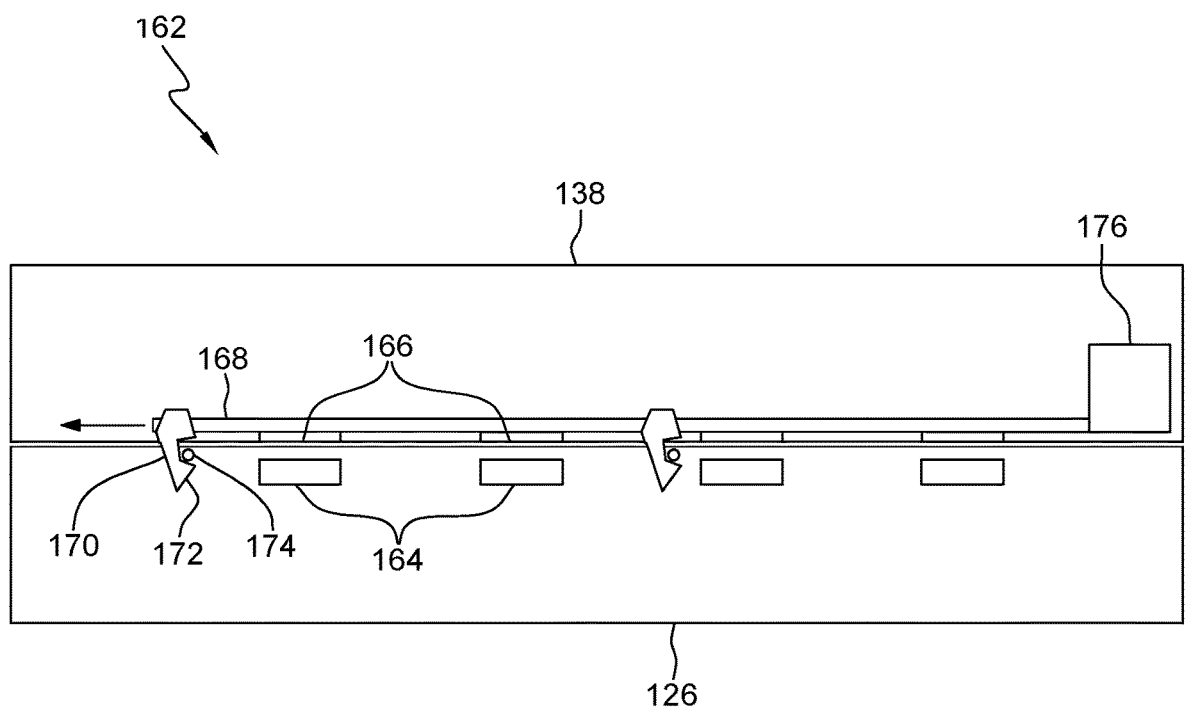
FIG. 4 is a side view of the shell closure assembly of the present invention.

Referring to FIG. 4, in the closed configuration, the first half-shell 126 and second half-shell 138 are held together by a closure assembly 162. In one embodiment, the closure assembly 162 includes magnets 164 located in the first half-shell 126 that are drawn to ferromagnetic pads 166 on a rigid bar 168 located in the second half-shell 138. The rigid bar 168 can be made of steel or other appropriate material. The ferromagnetic pads 166 are aligned with the magnets 164. The magnets 164 draw the two half-shells 126, 138 together by magnetic attraction between the magnets 164 and the ferromagnetic pads 166. The rigid bar 168 can also be fitted with two or more locking mechanisms 170, such as hooks 172 that engage pins 174, to lock the two half-shells 126, 138 in place. In order to deploy the array 100, the rigid bar 168 is moved longitudinally by an actuator 176, thus reducing the magnetic draw between the magnets 164 and the ferromagnetic pads 166 and simultaneously releasing the locking mechanisms 170. Once released, the buoyancy and ballast of the first plurality of tubes 118 and the second plurality of tubes 130, respectively, unwraps the array 100 to deploy it into its vertical state.

Figure 5A:
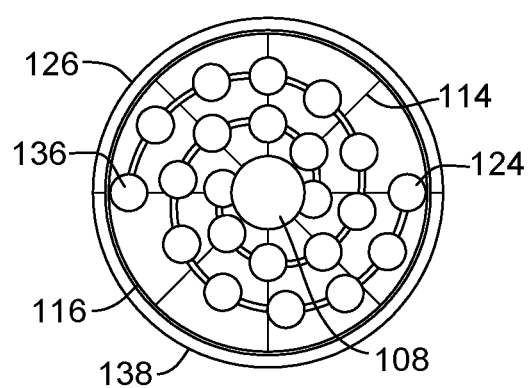
FIGS. 5A-5E illustrate the launch and recovery operations of the array of the present invention.
Figure 5B:
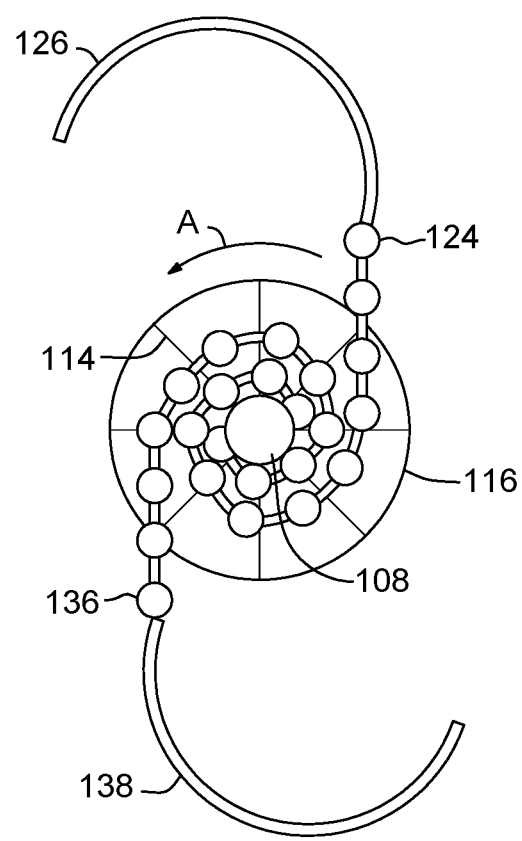
Figure 5C:
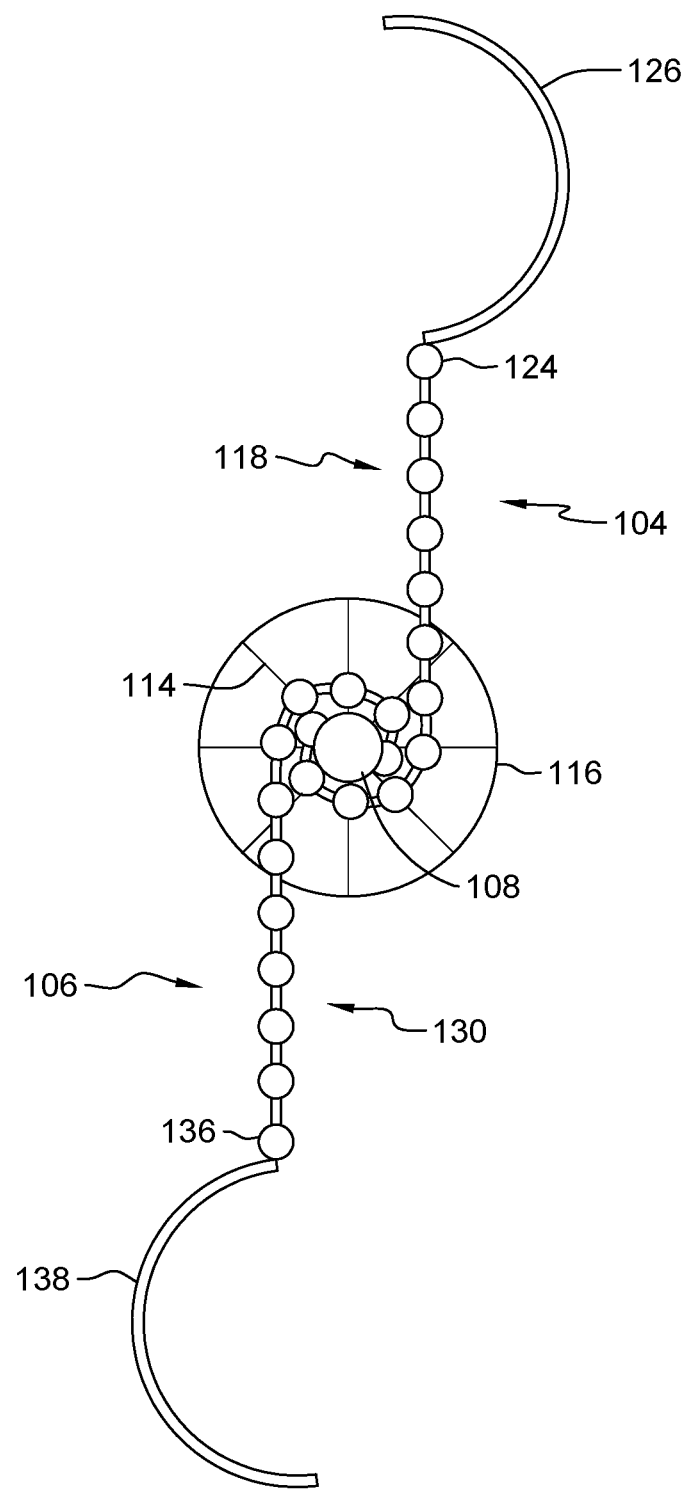
Figure 5D:
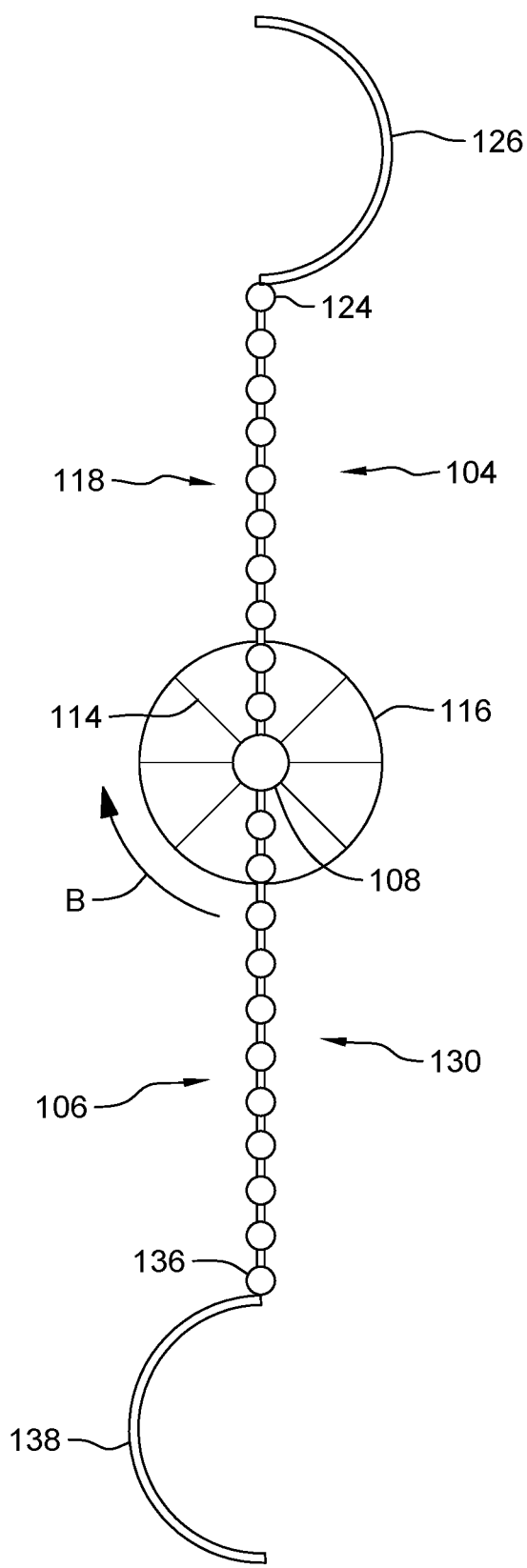
Figure 5E:
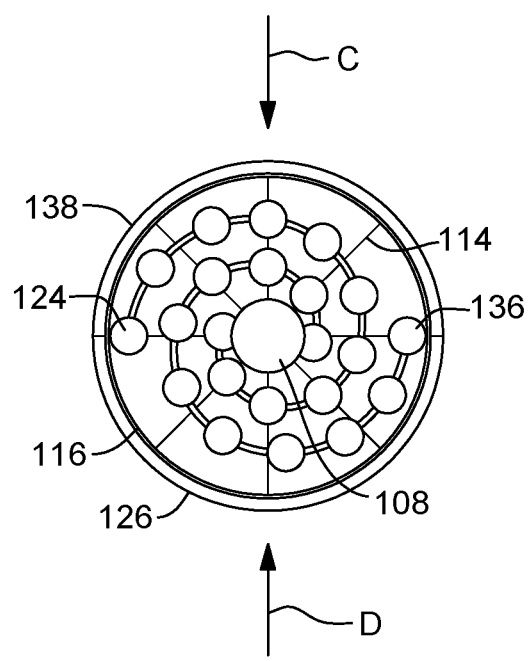

FIGS. 5A-5E show the launch and recovery operations of the array 100. As shown in FIG. 5A, the array 100 is initially stowed with the two half-shells 126, 138 locked in place. The fins 114 are straight and aligned with the flow of water. To deploy the array 100, the fins 114 remain aligned with the flow of water and the closure assembly 162 is released. The buoyancy of the first half-shell 126 and the ballast of the second half-shell 138 begin to unfurl the array 100, as indicated by arrow A in FIG. 5B. The buoyancy of the top section 104 of the array combined with the ballast of the bottom section 106 of the array aid of the two half-shells 126, 138 to slowly unroll the array 100, as shown in FIG. 5C. FIG. 5D shows the array 100 fully deployed into the open, vertical position. Throughout the unrolling of the array 100, the fins 114 do no hydrodynamic work to open the array 100. While underway, the fins 114 remain aligned with the flow, creating no torque.

During collapsing of the array 100, the actuator 112 changes the angle of attack of the fins 114 in the water to induce a torque on the center tube 108. The torque on the center tube 108 initiates a rolling action of the center tube 108, as indicated by arrow B in FIG. 5D. The rolling action of the center tube 108 causes the first plurality of tubes 118 and the second plurality of tubes 130 to wrap around the center tube 108. The center tube 108 continues to rotate until the positively buoyant first plurality of tubes 118 and the negatively buoyant second plurality of tubes 130 are wrapped around the center tube 108. As the array 100 is wrapping up, the positively buoyant first half-shell 126 and the negatively buoyant second half-shell 138 are pulled closer to the center tube 108 until the entire array is wrapped around the center tube 108, shown in FIG. 5B. The actuator continues to rotate the center tube 108 until the negatively buoyant second half-shell 138 is on top of the bundle and the positively buoyant first half-shell 126 is underneath. Then, the weight of the negatively buoyant second half-shell 138 creates a downward force indicated by arrow C, in FIG. 5E, and the buoyancy of the positively buoyant first half-shell 126 creates an upward force indicated by arrow D, in FIG. 5E; thus, their respective normal forces push the two shells together. The first half-shell 126 and second half-shell 138 are then held together by the closure assembly 162, described above. Once the array 100 is stowed, the fins 114 are straightened to align with the flow of water to reduce drag.

Figure 6:
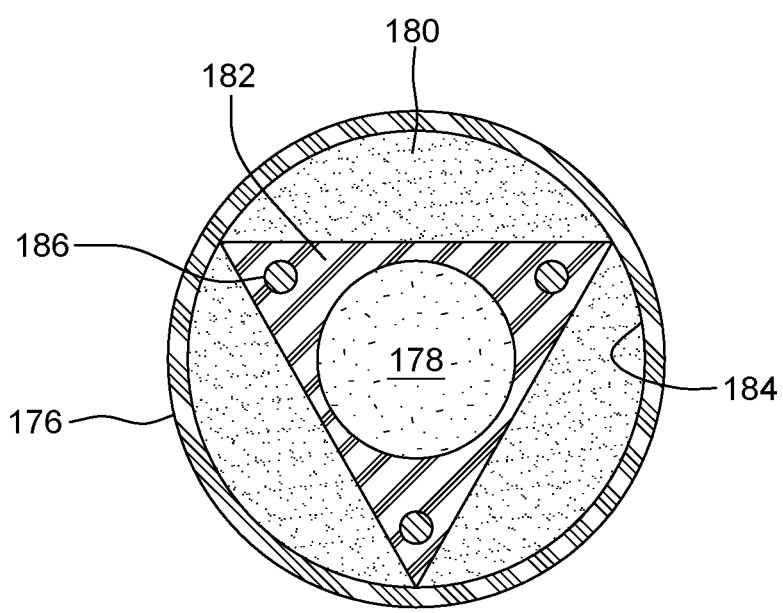
FIG. 6 is a cut-away view of an array tube of the present invention.
Figure 7:
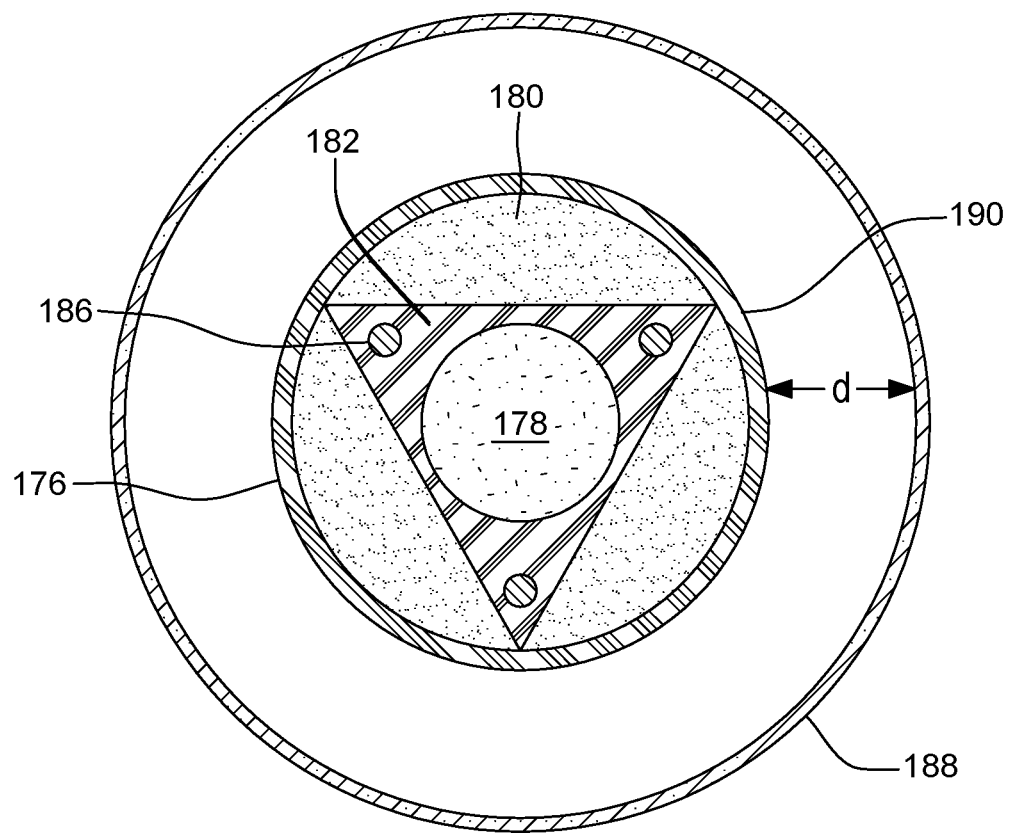
FIG. 7 is a cut-away view of a center tube of the present invention.

Referring to FIG. 6, the center tube 108, the first plurality of tubes 118, and the second plurality of tubes 130 of the array 100 are made of an elastomeric hose 176 having acoustic sensors, such as hydrophone 178 running along the length of the elastomeric hose 176. The elastomeric hose 176 is filled with acoustically transparent foam 180 and includes spacers 182 positioned along the length of the elastomeric hose 176 inside the elastomeric hose 176 between the hydrophone 178 and the inner wall 184 of the elastomeric hose 176. The spacers 182 support the hydrophone 178 within the elastomeric hose 176. Cables 186 are provided along the length of the elastomeric hose 176 extending between the spacers 182 to stabilize the array 100 and prevent it from vibrating. In some embodiments, three cables 186 are arranged in a triangle within the spacer 182 to support the array and minimize lateral and vertical vibrations. As shown in FIG. 7, the elastomeric hose 176 of the center tube 108 is surrounded by an acoustically transparent rigid tube 188, such as a fiberglass tube, or other appropriate material. The rigid tube 188 has a standoff distance, d, between itself and the outer wall 190 of the elastomeric hose 176 of the center tube 108. The rigid tube 188 provides structural integrity for the center tube 108.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

What is claimed is:

1. A planar sensor array, comprising:
   a center tube;
   a first plurality of tubes connected to a first side of said center tube, wherein each tube of said first plurality of tubes is connected at each end to an adjacent tube by a hinge, and at least a most distal tube of said first plurality of tubes being positively buoyant;
   a second plurality of tubes connected to a second side of said center tube, wherein each tube of said second plurality of tubes is connected at each end to an adjacent tube by a hinge, and at least a most distal tube of said second plurality of tubes being negatively buoyant;
   a plurality of acoustic sensors positioned within said center tube, each tube of said first plurality of tubes, and each tube of said second plurality of tubes;
   a first half-shell connected to the most distal tube of said first plurality of tubes, said first half-shell being positively buoyant;
   a second half-shell connected to the most distal tube of said second plurality of tubes, said second half-shell being negatively buoyant;
   an actuator attached to said center tube;
   fins attached to said actuator, said actuator being adjustable to change said fins angle of attack whereby environmental fluid flow over said fins induces a torque on said actuator and said center tube and causes rotation thereof, and wherein rotation of said center tube causes said first plurality of tubes and said second plurality of tubes to wrap around said center tube.

2. The apparatus in accordance with claim 1 wherein said center tube is neutrally buoyant.

3. The apparatus in accordance with claim 1 wherein:
   each tube of said first plurality of tubes is positively buoyant; and
   each tube of said second plurality of tubes is negatively buoyant.

4. The apparatus in accordance with claim 1 wherein said center tube, each tube of said first plurality of tubes, and each tube of said second plurality of tubes comprises an elastomeric hose with spacers positioned along the length of the elastomeric hose interior and supporting said acoustic sensors within the elastomeric hose.

5. The apparatus in accordance with claim 4 wherein the elastomeric hose is filled with acoustically transparent foam.

6. The apparatus in accordance with claim 4 wherein said elastomeric hose includes at least one cable extending between the spacers along the length of the elastomeric hose.

7. The apparatus in accordance with claim 4 wherein said center tube further comprises a rigid tube surrounding the elastomeric hose, said rigid tube having a standoff distance from the exterior of the elastomeric hose.

8. The apparatus in accordance with claim 7 wherein said rigid tube is acoustically transparent.

9. The apparatus in accordance with claim 1, further comprising:
   a plurality of magnets located in said first half-shell;
   a rigid bar located in said second half-shell, said rigid bar having a plurality of ferromagnetic pads aligned with said plurality of magnets;

a locking actuator attached to said rigid bar and capable of moving said rigid bar from an unlocked position to a locked position;

a plurality of pins located in said first half-shell; and a plurality of hooks attached to said rigid bar and each positioned to engage with one said pin upon action by said locking actuator to move said rigid bar into said locked position to lock said first half-shell to said second half-shell.

10. The apparatus in accordance with claim 1, further comprising:

a tow point for connection to an external towline;

an Electro-Optical (E/O) coupler having a stationary side joined to the tow point and a rotating side joined to said center tube.

11. A planar sensor array comprising:

a neutrally buoyant center tube;

a first plurality of positively buoyant tubes connected to a first side of said neutrally buoyant center tube, wherein each positively buoyant tube is hingedly connected beside an adjacent tube of said first plurality of positively buoyant tubes;

a second plurality of negatively buoyant tubes connected to a second side of said neutrally buoyant center tube, wherein each negatively buoyant tube is hingedly connected beside an adjacent tube of said second plurality of negatively buoyant tubes;

a plurality of acoustic sensors positioned inside and along the length of said neutrally buoyant center tube, said first plurality of tubes, and said second plurality of tubes;

a positively buoyant half-shell connected to the most distal tube of said positively buoyant tubes;

a negatively buoyant half-shell connected to the most distal tube of said negatively buoyant tubes;

a closure assembly having a first position holding said positively buoyant half-shell to said negatively buoyant half-shell and a second position releasing said positively buoyant half-shell from said negatively buoyant half-shell;

an actuator attached to said center tube;

fins attached to said actuator, said actuator being adjustable to change said fins angle of attack whereby environmental fluid flow over said fins induces a torque on said actuator and said center tube and causes rotation thereof, and wherein rotation of said center tube causes said first plurality of positively buoyant tubes and said second plurality of negatively buoyant tubes to wrap around said center tube; and a tow point attached to a forward end of said center tube, said tow point including a coupling assembly.

12. The apparatus in accordance with claim 11 wherein said neutrally buoyant center tube, each tube of said first plurality of positively buoyant tubes, and each tube of said second plurality of negatively buoyant tubes comprises an elastomeric hose with spacers positioned inside the elastomeric hose along the length of the elastomeric hose, the spacers supporting said acoustic sensors within the elastomeric hose.

13. The apparatus in accordance with claim 12 wherein the elastomeric hose is filled with acoustically transparent foam.

14. The apparatus in accordance with claim 12 wherein the elastomeric hose includes at least one cable extending between the spacers along the length of the elastomeric hose.

15. The apparatus in accordance with claim 12 wherein said center tube further comprises a rigid tube surrounding the elastomeric hose, said rigid tube having a standoff distance from the exterior of the elastomeric hose.

16. The apparatus in accordance with claim 15 wherein said rigid tube is acoustically transparent.

17. The apparatus in accordance with claim 11, said closure assembly comprising:

a plurality of magnets located in said positively buoyant half-shell;

a rigid bar located in said negatively buoyant half-shell, said rigid bar having a plurality of ferromagnetic pads positioned thereon; and a locking actuator joined to said rigid bar to move said rigid bar from a locked position where the plurality of ferromagnetic pads are proximate said plurality of magnets to an unlocked position where the plurality of ferromagnetic pads are away from said plurality of magnets.

18. The apparatus in accordance with claim 11, said coupling assembly comprising an Electro-Optical (E/O) coupler having a stationary side joined to the tow point and a rotating side joined to said neutrally buoyant center tube.

\* \* \* \* \*